(12) United States Patent
Heiss et al.

(10) Patent No.: US 12,242,277 B2
(45) Date of Patent: Mar. 4, 2025

(54) ROBOT GUIDING SYSTEM AND METHOD

(71) Applicant: Infineon Technologies AG, Neubiberg (DE)

(72) Inventors: Heinrich Guenther Heiss, Munich (DE); Raffaele Soloperto, Olching (DE)

(73) Assignee: Infineon Technologies AG, Neubiberg (DE)

( * ) Notice: Subject to any disclaimer, the term of this patent is extended or adjusted under 35 U.S.C. 154(b) by 544 days.

(21) Appl. No.: 17/403,459

(22) Filed: Aug. 16, 2021

(65) Prior Publication Data

US 2022/0083075 A1    Mar. 17, 2022

(30) Foreign Application Priority Data

Sep. 15, 2020    (EP) .................................... 20196194

(51) Int. Cl.
| | |
|---|---|
| *G05D 1/00* | (2024.01) |
| *G01S 7/292* | (2006.01) |
| *G01S 13/28* | (2006.01) |
| *G01S 13/42* | (2006.01) |
| *H04W 4/40* | (2018.01) |

(52) U.S. Cl.
CPC ............ *G05D 1/0257* (2013.01); *G01S 7/292* (2013.01); *G01S 13/288* (2013.01); *G01S 13/428* (2013.01); *G05D 1/0225* (2013.01); *H04W 4/40* (2018.02)

(58) Field of Classification Search
CPC ........... A47L 2201/022; A47L 2201/02; A47L 9/2873; A47L 9/2852; G05D 2201/0215; G05D 2201/0208; G05D 1/0225; G05D 1/0242; G05D 1/0257; G05D 1/028; G05D 1/0088; H04W 4/40; H04W 92/18; H04B 10/116
See application file for complete search history.

(56) References Cited

U.S. PATENT DOCUMENTS

| | | | | |
|---|---|---|---|---|
| 4,834,531 | A * | 5/1989 | Ward .................... | G01S 17/875 244/172.4 |
| 5,247,306 | A * | 9/1993 | Hardange ............ | G05D 1/0257 342/92 |
| 7,561,886 | B1 * | 7/2009 | Gonring .................. | G01C 3/08 340/514 |
| 7,933,687 | B2 * | 4/2011 | Baek ..................... | G05D 1/0272 700/258 |
| 8,380,350 | B2 * | 2/2013 | Ozick .................. | A47L 9/2857 700/250 |

(Continued)

FOREIGN PATENT DOCUMENTS

| | | | | |
|---|---|---|---|---|
| EP | 3557355 | A1 | 10/2019 | |
| WO | WO2019088695 | * | 9/2019 | ............... A47L 9/28 |
| WO | WO 2020001490 | * | 2/2020 | |

*Primary Examiner* — Steven B Theriault
(74) *Attorney, Agent, or Firm* — Slater Matsil, LLP

(57) ABSTRACT

Embodiments of the present disclosure relate to a guiding system for a robot. The guiding system includes a millimeter-wave positioning system and a transmitter. The millimeter-wave positioning system is configured to determine a position of the robot relative to a base station for charging the robot. The transmitter is configured to emit a radar guiding signal for guiding the robot to the base station and to steer the radar guiding signal towards the position of the robot.

20 Claims, 6 Drawing Sheets

(56) References Cited

U.S. PATENT DOCUMENTS

| | | | |
|---|---|---|---|
| 8,780,342 B2* | 7/2014 | DiBernardo | G05D 1/0234 700/59 |
| 9,280,158 B2* | 3/2016 | Bron | G05D 1/0234 |
| 9,717,387 B1* | 8/2017 | Szatmary | G06N 3/008 |
| 9,774,996 B1* | 9/2017 | Frydman | G01S 5/10 |
| 9,826,873 B2* | 11/2017 | Abe | G05D 1/0011 |
| 9,900,858 B2* | 2/2018 | Walma | G01S 5/12 |
| 9,989,968 B2* | 6/2018 | Shen | G05D 1/0242 |
| 10,274,964 B2* | 4/2019 | Wu | B25J 19/005 |
| 10,300,804 B2* | 5/2019 | Salasoo | B60L 53/36 |
| 10,365,656 B2* | 7/2019 | Moore | G05D 1/0274 |
| 10,466,710 B2* | 11/2019 | Biber | B60L 53/36 |
| 10,698,411 B1* | 6/2020 | Ebrahimi Afrouzi | G05D 1/0225 |
| 10,901,431 B1* | 1/2021 | Ebrahimi Afrouzi | G05D 1/0246 |
| 11,037,320 B1* | 6/2021 | Ebrahimi Afrouzi | G06T 7/90 |
| 11,126,885 B2* | 9/2021 | Santra | G06V 40/28 |
| 11,187,796 B2* | 11/2021 | Choi | G01S 13/18 |
| 11,199,853 B1* | 12/2021 | Afrouzi | B25J 13/006 |
| 11,340,626 B2* | 5/2022 | He | A47L 11/24 |
| 11,348,269 B1* | 5/2022 | Ebrahimi Afrouzi | G01S 17/86 |
| 11,669,105 B2* | 6/2023 | Grubeck | B25J 19/027 701/23 |
| 11,712,143 B2* | 8/2023 | Nien | A47L 9/2873 701/23 |
| 11,771,076 B2* | 10/2023 | Zhou | B64C 39/024 701/11 |
| 11,910,742 B2* | 2/2024 | Ko | B25J 11/008 |
| 2004/0158357 A1 | 8/2004 | Lee et al. | |
| 2004/0222902 A1* | 11/2004 | Wortsmith | B63B 49/00 340/686.2 |
| 2004/0235497 A1* | 11/2004 | Zekavat | H04W 64/00 455/456.2 |
| 2005/0150697 A1* | 7/2005 | Altman | G06F 3/014 178/19.02 |
| 2005/0156562 A1* | 7/2005 | Cohen | G01S 1/7034 320/107 |
| 2005/0213082 A1* | 9/2005 | DiBernardo | G05D 1/0234 356/139.03 |
| 2005/0221840 A1* | 10/2005 | Yamamoto | G05D 1/0225 455/456.3 |
| 2005/0281436 A1* | 12/2005 | Gehring | G06V 10/255 382/104 |
| 2006/0087273 A1* | 4/2006 | Ko | A47L 9/2805 318/587 |
| 2007/0050086 A1* | 3/2007 | Lim | G05D 1/0242 700/245 |
| 2007/0096675 A1* | 5/2007 | Kim | G05D 1/0225 318/587 |
| 2007/0222969 A1* | 9/2007 | Millgard | G08G 5/0026 356/342 |
| 2008/0065266 A1* | 3/2008 | Kim | G05D 1/0242 901/1 |
| 2008/0161969 A1* | 7/2008 | Lee | G05D 1/0234 318/568.12 |
| 2009/0177320 A1* | 7/2009 | Lee | G05D 1/0225 901/1 |
| 2010/0097263 A1* | 4/2010 | Vacanti | G01S 7/35 342/70 |
| 2010/0324731 A1 | 12/2010 | Letsky | |
| 2010/0324736 A1* | 12/2010 | Yoo | G05D 1/0234 398/201 |
| 2012/0185094 A1* | 7/2012 | Rosenstein | G05D 1/0272 901/1 |
| 2013/0226344 A1* | 8/2013 | Wong | G05D 1/024 901/1 |
| 2014/0371907 A1* | 12/2014 | Passot | G06N 3/008 700/257 |
| 2014/0371912 A1* | 12/2014 | Passot | G06N 3/049 700/264 |
| 2015/0134144 A1* | 5/2015 | Bron | G05D 1/0234 701/2 |
| 2015/0151646 A1* | 6/2015 | Noiri | B60L 15/20 701/22 |
| 2015/0289740 A1* | 10/2015 | Yan | G05D 1/0242 701/2 |
| 2016/0100521 A1* | 4/2016 | Halloran | G05D 1/0259 180/169 |
| 2016/0229060 A1* | 8/2016 | Kim | B25J 9/1694 |
| 2017/0146642 A1* | 5/2017 | Stokes | G01S 7/6245 |
| 2017/0176586 A1* | 6/2017 | Johnson | G01C 17/38 |
| 2017/0227627 A1* | 8/2017 | Chanda | G01S 7/4052 |
| 2018/0081366 A1* | 3/2018 | Tan | G01C 21/20 |
| 2018/0098676 A1* | 4/2018 | Ryu | A47L 9/2894 |
| 2018/0120852 A1* | 5/2018 | Cho | G05D 1/027 |
| 2018/0125318 A1* | 5/2018 | Cornelissen | A47L 9/2852 |
| 2018/0127027 A1* | 5/2018 | Brennan | B62D 13/06 |
| 2018/0210079 A1* | 7/2018 | Hammerschmidt | G01S 13/931 |
| 2018/0246518 A1* | 8/2018 | Vogel | G05D 1/0234 |
| 2018/0249872 A1* | 9/2018 | Park | G06V 20/64 |
| 2018/0286147 A1* | 10/2018 | Naito | G05D 1/0291 |
| 2018/0292837 A1* | 10/2018 | Chen | G05D 1/0236 |
| 2018/0343604 A1* | 11/2018 | Wu | H04L 5/0048 |
| 2019/0064835 A1* | 2/2019 | Hoofard | G05D 1/0228 |
| 2019/0106223 A1* | 4/2019 | Håkansson | G08G 5/065 |
| 2019/0171210 A1* | 6/2019 | Passot | G05D 1/0272 |
| 2019/0202067 A1* | 7/2019 | Xiong | B25J 9/1697 |
| 2019/0204847 A1* | 7/2019 | Noh | G01S 13/87 |
| 2019/0248007 A1* | 8/2019 | Duffy | B25J 15/0066 |
| 2019/0265353 A1* | 8/2019 | Jones | G01S 15/8915 |
| 2019/0317190 A1* | 10/2019 | Santra | G01S 13/89 |
| 2019/0339356 A1* | 11/2019 | Schildknecht | G01J 1/0422 |
| 2020/0018855 A1* | 1/2020 | Liu | G06Q 10/087 |
| 2020/0022552 A1* | 1/2020 | Han | A47L 9/2873 |
| 2020/0030982 A1* | 1/2020 | Xiong | G05D 1/0242 |
| 2020/0042004 A1* | 2/2020 | Fujiyama | G05D 1/0206 |
| 2020/0064483 A1* | 2/2020 | Li | G01S 13/867 |
| 2020/0077859 A1* | 3/2020 | Nien | B60L 53/36 |
| 2020/0091608 A1* | 3/2020 | Alpman | H01Q 1/243 |
| 2020/0093342 A1* | 3/2020 | Jeong | A47L 11/4005 |
| 2020/0121148 A1* | 4/2020 | Hoffman | G05D 1/0242 |
| 2020/0132471 A1* | 4/2020 | Kaneko | G01C 21/28 |
| 2020/0150676 A1* | 5/2020 | Huang | G05D 1/0236 |
| 2020/0211313 A1* | 7/2020 | Chen | G06Q 20/322 |
| 2020/0278444 A1* | 9/2020 | Va | G01S 13/89 |
| 2020/0319334 A1* | 10/2020 | Zhan | G01S 7/40 |
| 2021/0186289 A1* | 6/2021 | Park | A47L 11/4061 |
| 2021/0189749 A1* | 6/2021 | Yu | G05D 1/0225 |
| 2021/0231775 A1* | 7/2021 | Pezeshk | G01S 7/417 |
| 2021/0263131 A1* | 8/2021 | Dalfra | G05D 1/0257 |
| 2021/0321447 A1* | 10/2021 | Lee | H04W 72/044 |
| 2022/0036750 A1* | 2/2022 | Poojary | G01S 13/867 |
| 2022/0066025 A1* | 3/2022 | Berkmo | G08G 5/0017 |
| 2022/0066456 A1* | 3/2022 | Ebrahimi Afrouzi | B25J 9/1697 |
| 2022/0091257 A1* | 3/2022 | Almers | G01S 13/30 |
| 2022/0280009 A1* | 9/2022 | Tan | A47L 11/4066 |
| 2023/0213946 A1* | 7/2023 | Wyatt | G05D 1/0274 700/245 |
| 2023/0305133 A1* | 9/2023 | Ye | G01S 5/06 |

* cited by examiner

ROBOT GUIDING SYSTEM AND METHOD

This application claims the benefit of European Patent Application No. 20196194, filed on Sep. 15, 2020, which application is hereby incorporated herein by reference in its entirety.

TECHNICAL FIELD

Embodiments of the present disclosure relate to a guiding system and method for a robot.

BACKGROUND

For navigation of robots, radiation-based guiding systems can be used.

Known guiding systems irradiate their environment with a radiation signal for guiding the robots along an increasing intensity of the radiation signal to the base station. Due to distortions (e.g. interferences) of the radiation signal, the robot may follow a wrong path and, in some cases, therefore, gets discharged or lost, i.e. out of the irradiated environment. Thus, the robots may need to be connected to the base station manually.

SUMMARY

Embodiments of the present disclosure relate to a guiding system for a robot. The guiding system comprises a millimeter-wave positioning system and a transmitter. The millimeter-wave positioning system is configured to determine a position of the robot relative to a base station for charging the robot. The transmitter is configured to emit a radar guiding signal for guiding the robot to the base station and to steer the radar guiding signal towards the position of the robot.

Some embodiments relate to a method for guiding a robot. The method comprises determining a position of the robot relative to a base station for charging the robot and emitting a radar guiding signal for guiding the robot to the base station and steering the radar guiding signal towards the position of the robot.

The aforementioned guiding system, for example, is able to execute this method. Therefore, the features and aspects of the guiding system described herein can be mutatis mutandis applied to the method.

BRIEF DESCRIPTION OF THE DRAWINGS

Some examples of apparatuses and/or methods will be described in the following by way of example only, and with reference to the accompanying figures, in which.

DETAILED DESCRIPTION OF ILLUSTRATIVE EMBODIMENTS

Figure 1:
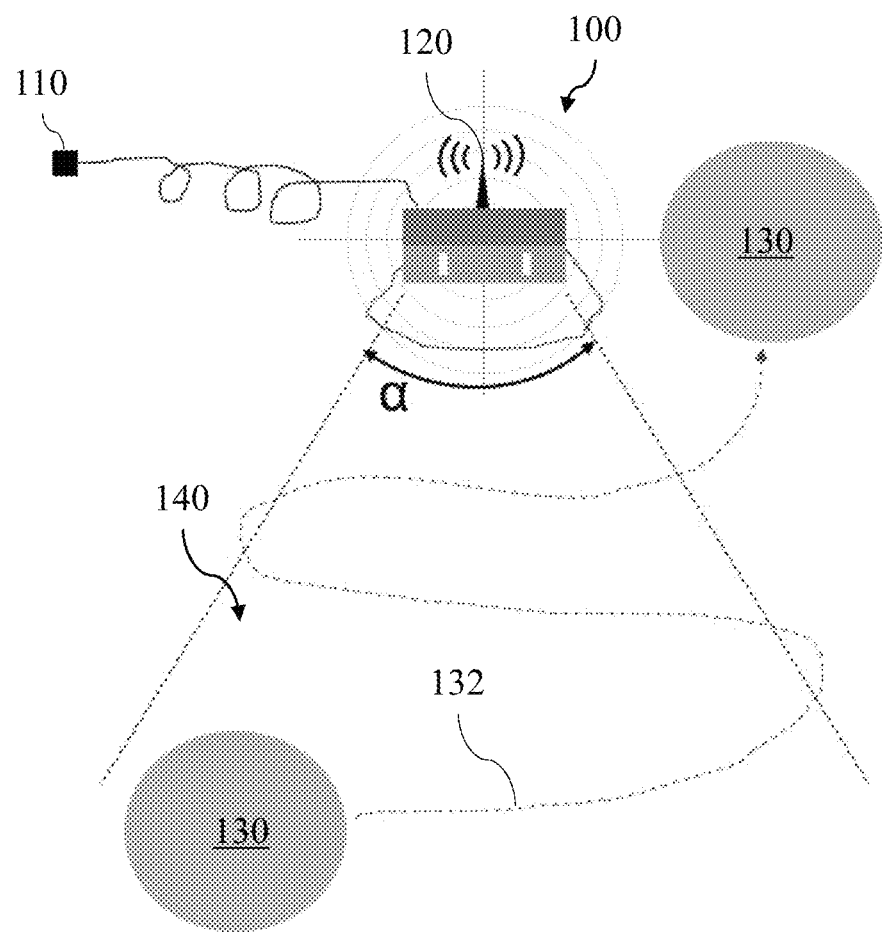
FIG. 1 illustrates a known concept for guiding a robot.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Some embodiments of the present disclosure relate to a guiding system for a robot, a base station including such a guiding system, and a method for guiding a robot. In particular but not exclusively, embodiments relate to a radar-based guiding system for a robot.

In various embodiments, the robot, for example, is a lawnmower robot, a vacuum cleaner robot, a household robot, or another at least partially automatically controlled/steered mobile device (e.g. an at least partially automatically steered vehicle).

The millimeter-wave positioning system, for example, may be a radar-based positioning system using a millimeter-wave signal for locating the robot, i.e. the position of the robot relative to the base station. The position can be indicative of coordinates in a predefined reference coordinate system of the base station.

The radar guiding signal may be a millimeter-wave signal having a frequency between 3 GHz and 300 GHz (i.e. a wavelength between 1 and 100 mm). Since the radar guiding signal is steered to the robot's position, it can be understood as a directional signal towards the robot/the robot's position. This allows the radar guiding signal to be emitted in a smaller field of view than in applications using an "undirected" signal, which is not purposefully directed to the robot, for guiding the robot. Therefore, a probability or number of distortions of the (directional) radar guiding signal can be less than for undirected signals. Further, this may reduce a probability to guide the robot along a wrong path or of the robot to get lost and possibly discharged somewhere away from the base station.

In general, the guiding system may be installed in or separate from the base station of the robot. It is to be noted that, according to some embodiments, the guiding system generally can be configured to guide multiple robots, for example, using multiple (directional) radar guiding signals directed/steered to the robots.

Some embodiments relate to a base station for a robot in which the base station comprises the aforementioned guiding system. The base station can be understood as a stationary device to which the robot can dock for charging, maintaining, and/or cleaning the robot. The guiding system, for example, may be installed adjacent or next to a docking port for guiding the robot to or at least close to the docking port.

FIG. 1 illustrates a known concept for guiding a robot 130 to its base station 100. For example, this enables the robot 130 to find and dock to the base station 100 automatically, e.g. for charging or maintenance purposes.

The robot 13o, for example, is a vacuum cleaner robot which moves automatically within a predefined outdoor or indoor movement area (e.g. in a living space).

To guide the robot 130 to the base station 100, the base station 100 exhibits an antenna 120 emitting a radiation signal within a predefined field of view (FoV) 14o. The robot 130 can orient itself by the radiation signal and follow an intensity distribution or power distribution of the radiation signal over the FoV 140 to find the base station 100.

The robot 13o, for example, follows a path 132 along an increasing intensity of the intensity distribution or an increasing average power level of the power distribution within the FoV 140 to find the base station 100. For this purpose, the robot 130 can be equipped with a sensor (not shown) for sensing the intensity of the radiation or average power level of the radiation in time intervals and a navigation unit (not shown) for navigating the robot 130 in direction to maximum values of the sensed intensity or average power level.

A directivity of the field of view 140 is represented by an opening angle α, e.g. indicating a half-power beamwidth of the radiation signal. The opening angle α can be set such that the field of view covers most of the robot's movement area to guide the robot to the base station 100 from most of the positions in the movement area. In typical applications of such known guiding systems, the radiation signal has a half-power beamwidth/opening angle α between 30° and 160°.

Distortions (e.g. interferences) of the radiation signal and its intensity distribution may cause the robot 130 to follow a wrong path. Such distortions, for example, are caused by objects within the field of view 140. As can be seen in FIG. 1, the robot 130 can end up outside of the field of view 140 resulting from following a wrong path and may not be able to find its way (back) to the base station 100. Consequently, the robot 130 may be discharged completely before reaching the base station 100 and may need to be coupled to the base station 100 manually.

Hence, there may be a demand for an improved concept for a guiding system. A concept for satisfying this demand is described below with reference to FIGS. 2-6.

Figure 2:
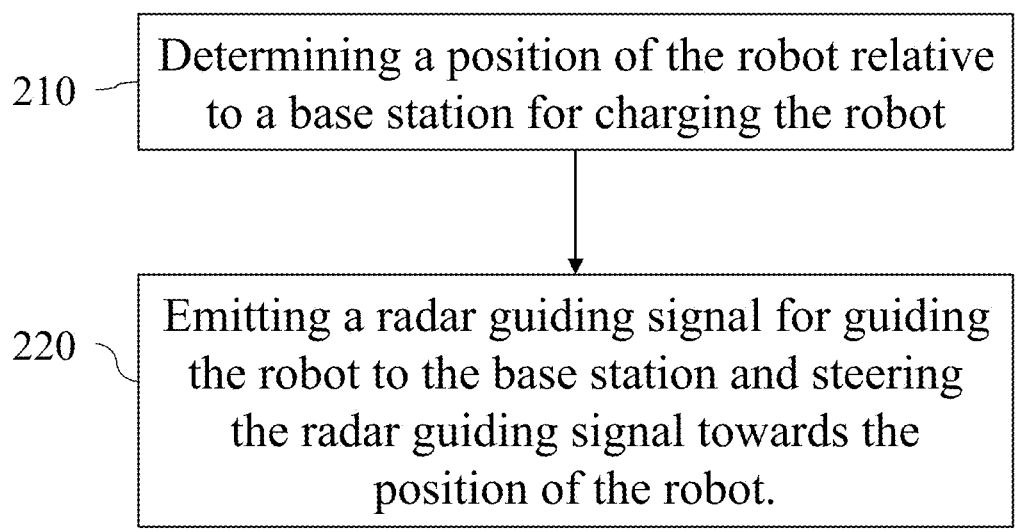
FIG. 2 shows a flowchart schematically illustrating a method for guiding a robot.

FIG. 2 shows a flowchart schematically illustrating a method 200 for guiding a robot. Method 200 comprises determining 210 a position of the robot relative to a base station for charging the robot. Further, method 200 comprises emitting 220 a radar guiding signal for guiding the robot to the base station and steering the radar guiding signal towards the position of the robot.

In context of the present disclosure, the robot, particularly, is to be understood as an at least partially automatically controlled/steered mobile device. In some applications, the robot is a lawnmower robot, a vacuum cleaner robot, a household robot, or another type of robot. In other applications, an at least partially automatically steered vehicle embodies the robot. The vehicle, for example, is an autonomously steered vehicle (e.g. an autonomously driving car or an autonomously flying aerial vehicle).

The base station can be a stationary (installed) device. The radar guiding signal, for example, enables the robot to find the base station automatically by following a radiation pattern (e.g. intensity pattern) of the radar guiding signal and to dock to the base station, e.g. for charging and maintenance/service purposes.

The radar guiding signal can be (specifically or purposely) directed to the robot based on the sensed position of the robot. This allows to use a smaller field of view irradiated with the radar guiding signal for less distortions of the radar guiding signal than in applications using an arbitrary, undirected signal, which is not purposefully directed to the robot, for guiding the robot. The field of view irradiated with the radar guiding signal, for example, is smaller than in the example of FIG. 1. In particular, this can reduce a probability of the robot to follow a wrong path and/or "get lost" while trying to find the base station.

The smaller field of view may also lead to a shorter route which the robot travels on its way to the base station and, thus, to a lower energy consumption.

More details and aspects are mentioned in connection with the embodiments described below with reference to further figures.

Figure 3:
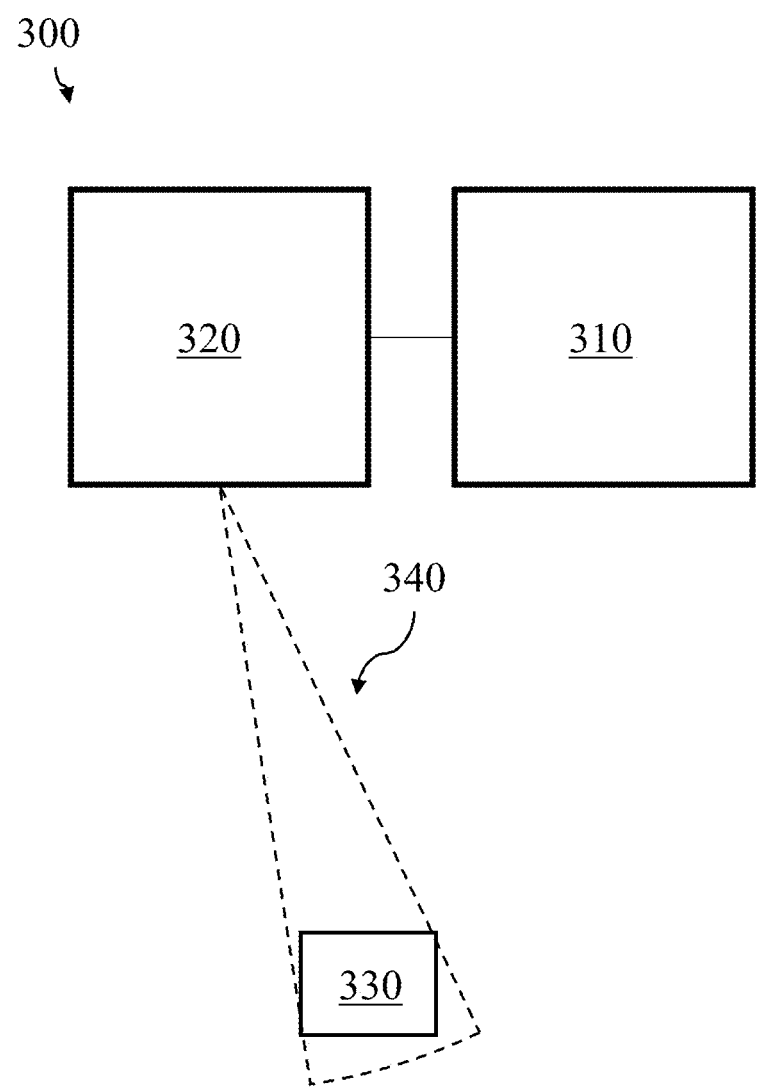
FIG. 3 shows a block diagram schematically illustrating a guiding system for a robot.

Method 200, for example, can be executed by guiding system 300 illustrated in FIG. 3.

The guiding system 300 comprises a millimeter-wave positioning system 310 for determining 210 a position of a robot 330 relative to a base station (not shown) for charging the robot 330 and a transmitter 320 for emitting a radar guiding signal 340 for guiding the robot 330 to the base station and steering the radar guiding signal 340 towards the position of the robot 330.

In some applications, the robot 330 is a vacuum cleaner robot, a lawnmower robot, or a household robot. The guiding system 300, for example, is installed in the base station.

The millimeter-wave positioning system 310, for example, is a radar positioning system using reflections or a so-called "echo" of a radar positioning signal from the robot 330 for determining 210 the position of the robot 330.

The transmitter 320, for example, uses beam steering to control the radar guiding signal 340 and direct/steer the radar guiding signal 340 (purposefully) based on the sensed position towards the robot. As stated in more detail later, the transmitter 320 can comprise multiple transmit elements for beam steering.

The robot 330 can be equipped with a sensor (not shown) for sensing the intensity of the radar guiding signal and a navigation unit (not shown) for navigating the robot 330 based on the sensed intensity.

The millimeter-wave positioning system 310 and the transmitter 320 can be separate devices, e.g. using separate antennas for emitting the radar positioning and the radar guiding signal 340.

Alternatively, the millimeter-wave positioning system 310 and the transmitter 320 can mutually use (i.e. share) the transmit elements for emitting the radar positioning and radar guiding signal 340, as stated in more detail later with reference to FIG. 4.

The millimeter-wave positioning system 310 and the transmitter 320 also can use a common data processing circuitry or separate respective data processing circuitries to control the separate or mutually used transmit elements emitting the radar positioning and radar guiding signal 340, respectively.

Figure 4:
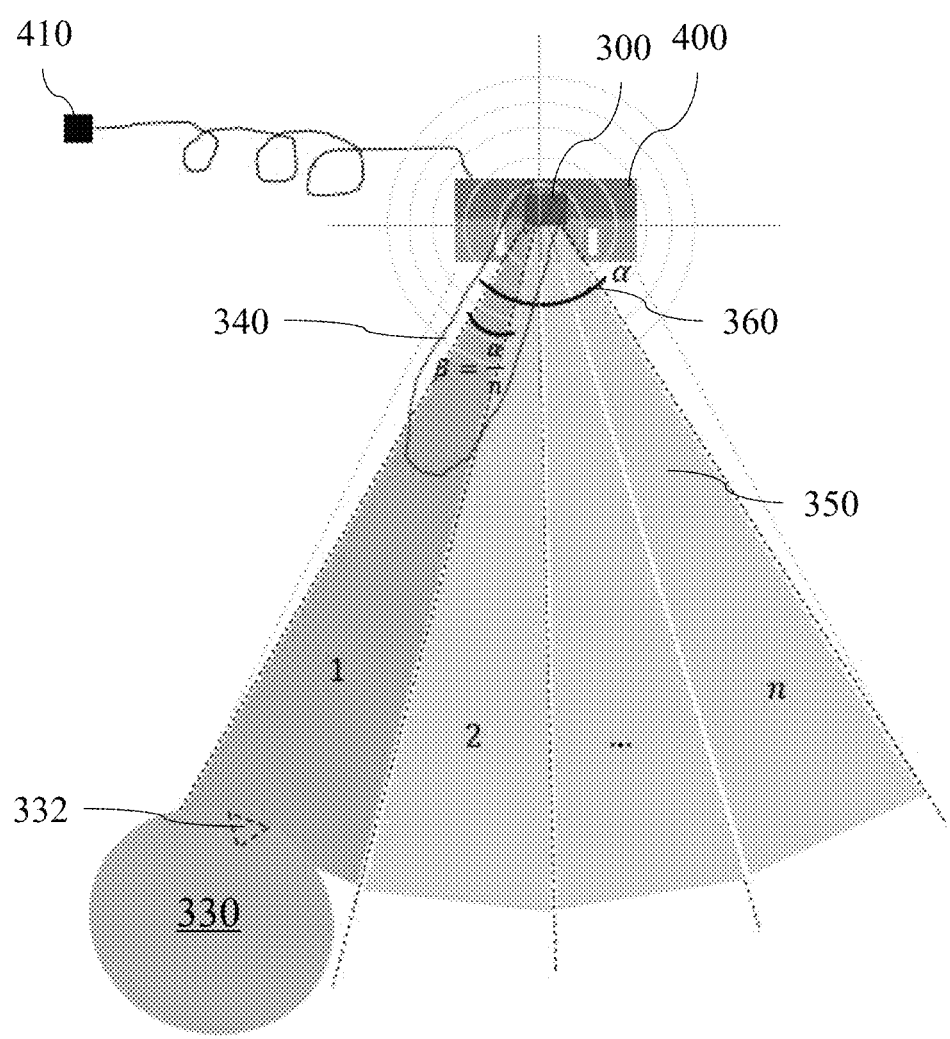
FIG. 4 illustrates an exemplary application of the guiding system in a base station of the robot.

FIG. 4 illustrates an exemplary application of the guiding system 300 in a base station 400 of the robot 330. The base station 400 can be stationary placed next to and facing a movement area of the robot 330. The movement area, for example, comprises a living space or a garden of a user if the robot is a vacuum cleaner or lawnmower robot, respectively.

The guiding system 300 comprises a plurality of radar transmit elements with different sub-fields of view 1, 2, . . . , n covering an overall field of view 360. The radar transmits elements, for example, comprise differently oriented radar antennas. The transmit elements, e.g., comprise one or more horn antennas and/or patch antennas.

As outlined below, both the millimeter-wave positioning system 310 and the transmitter 320 can use the radar transmit elements. The millimeter-wave positioning system 310 can use the radar transmit elements for emitting a radar positioning signal 350 and determining 210 the position of the robot 330. The transmitter 320 can use the radar transmit elements for emitting 220 the radar guiding signal 340 for guiding the robot 330.

To capture the robot 330 in most of the robot's movement area with the radar positioning signal 350, the overall field of view 360, for example, has an opening angle α or half-power beamwidth of 45°. In alternative embodiments, a different, e.g. a larger or smaller overall field of view may be used. As can be seen in FIG. 4, the overall field of view 360 (theoretically) can be evenly divided into the sub-fields of view 1, 2, . . . , n. Accordingly, the sub-fields of view 1, 2, . . . , n have an opening angle or half-power beamwidth of β=α/n. In practice, the radar transmit elements may not have adjacent but overlapping sub-fields of view 1, 2, . . . , n having an opening angle or a half-power beamwidth of β≳α/n and β<α.

In a first step, the radar transmit elements are used to emit the radar positioning signal 350 in the overall field of view 360 to determine the robot's position using reflections of the radar positioning signal 350. The millimeter-wave positioning system 310, for example, further comprises one, two, or more receive antennas (not shown) to receive the reflections and a data processing unit (not shown) to determine the position using the reflections.

The skilled person having benefit from the present disclosure will appreciate that the reflections or a sequence of reflections are indicative of a velocity, a material, a shape and/or a position of objects within the field of view 360. To identify the robot 330 among multiple detected objects, the data processing circuitry can compare velocities of the sensed objects with a predefined velocity of the robot 330. Reflections related to the robot 330 can be used to determine the robot's position.

Alternatively, the data processing circuitry can identify and locate the robot 330 from the reflections by its shape or material (radar signature).

As can be seen from FIG. 4, the millimeter-wave positioning system 310, for example, detects the robot 330 in sub-field of view 1.

In a next step, the respective radar transmit element with sub-field of view 1 is selected and used to emit and steer the radar guiding signal 340 to the robot 330.

In other scenarios where the robot 330 is detected in sub-field of view 2 or n, the respective radar transmit element with sub-field of view 2 or n is used to emit the radar guiding signal 340.

The radar guiding signal 340 can be a continuous, a modulated (e.g. a frequency-modulated continuous wave (FMCW)), or pulsed signal which is transmitted until the robot arrives at, e.g. docks to, the base station 400.

It is noted that, alternatively, multiple transmit antennas (e.g. having adjacent fields of view) can be used to emit the radar guiding signal 340.

The skilled person having benefit from the present disclosure will appreciate that the transmit elements (e.g. multiple patch antennas) can optionally be operated in a phased array (or electronically scanned array) configuration for the to determine the position of the robot.

The robot 330 optionally (indicated by dashed lines) is equipped with a reflector 332 for the radar positioning signal 350. This may lead to stronger reflections of the radar positioning signal from the robot 330 and a more precise and/or reliable location of the robot 330. It is noted that the robot can be also equipped with multiple reflectors which, e.g., are mounted around the robot to reflect the radar positioning signal at various orientations of the robot.

The base station 400 is powered by a power supply 410.

Figure 5:
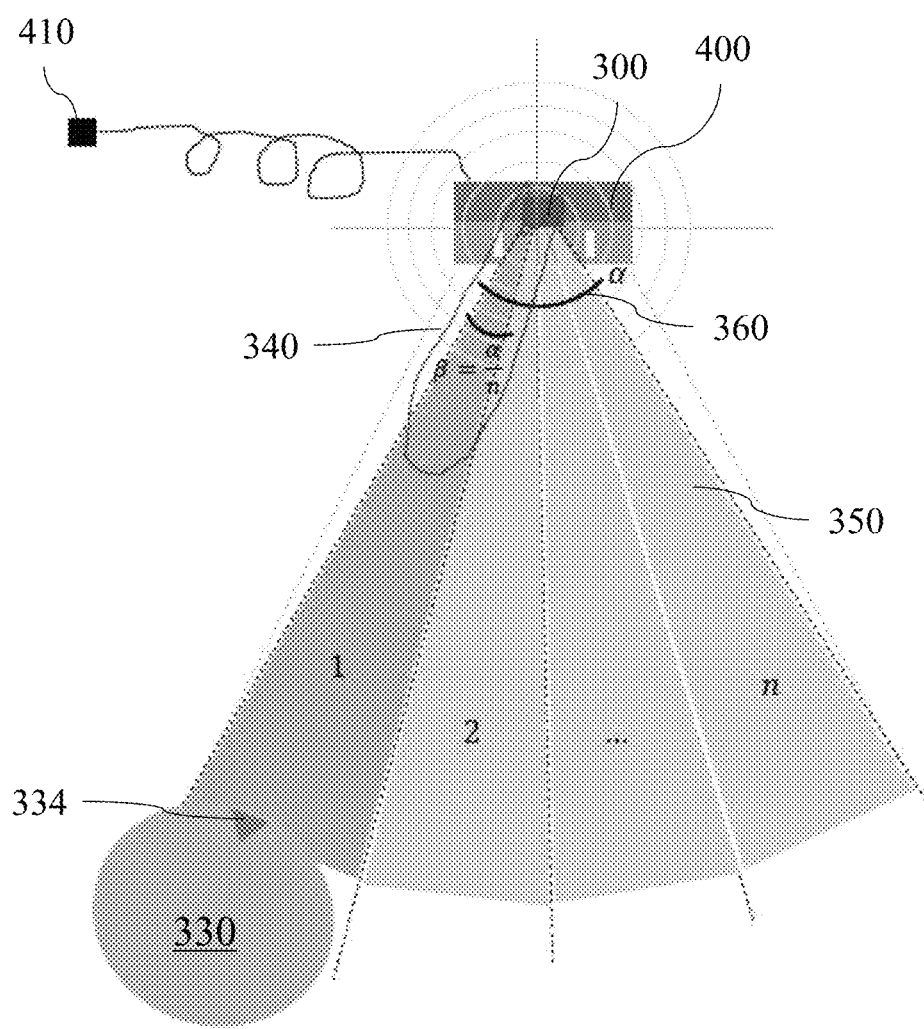
FIG. 5 illustrates another exemplary application of the guiding system suitable for phase-modulation-based communication with the robot.

FIG. 5 illustrates another exemplary application of the guiding system 300 suitable for phase-modulation-based communication with the robot.

The guiding system 300 includes a communication system (not shown) for phase-modulation-based communication, i.e. communication using phase-modulated signals, with the robot.

The communication system, for example, comprises a communication antenna and a modulator for controlling the communication antenna to emit a phase-modulated (communication) signal. To save costs for a separate communication antenna, one or multiple of the radar transmit elements can be used as communication antennas.

Preferably, the radar guiding signal 340 includes the phase-modulated signal to communicate while guiding the robot 330. For example, the radar guiding signal 340 is phase-modulated.

In turn, the robot 330 comprises a receiver for receiving and processing the phase-modulated signal.

In this way, the communication system can communicate with the robot. In some applications, the communication system can communicate the robot's position or navigation messages which include instructions for movement of the robot 330, through the phase-modulated signal. The communication can reduce a probability of the robot 330 to get lost.

The communication, for example, is based on (binary) phase-shift keying. The modulator can use (binary) phase-shift keying to generate the phase-modulated signal indicative of the robot's position, navigation messages, and/or other information. Optionally, one or more of predefined frequency bands can be used for the communication. In some embodiments, one or more frequency bands reserved for industrial, scientific, and medical (ISM), so-called ISM (radio) bands, are used for the communication, e.g. to avoid predefined (legal) restrictions related to signals, e.g. related to a modulation scheme of such signals, for the communication outside the ISM bands.

In some applications, the robot 330 and the communication system each comprise a transceiver for a two-way communication over a peer-to-peer connection using phase-modulated signals.

Figure 6:
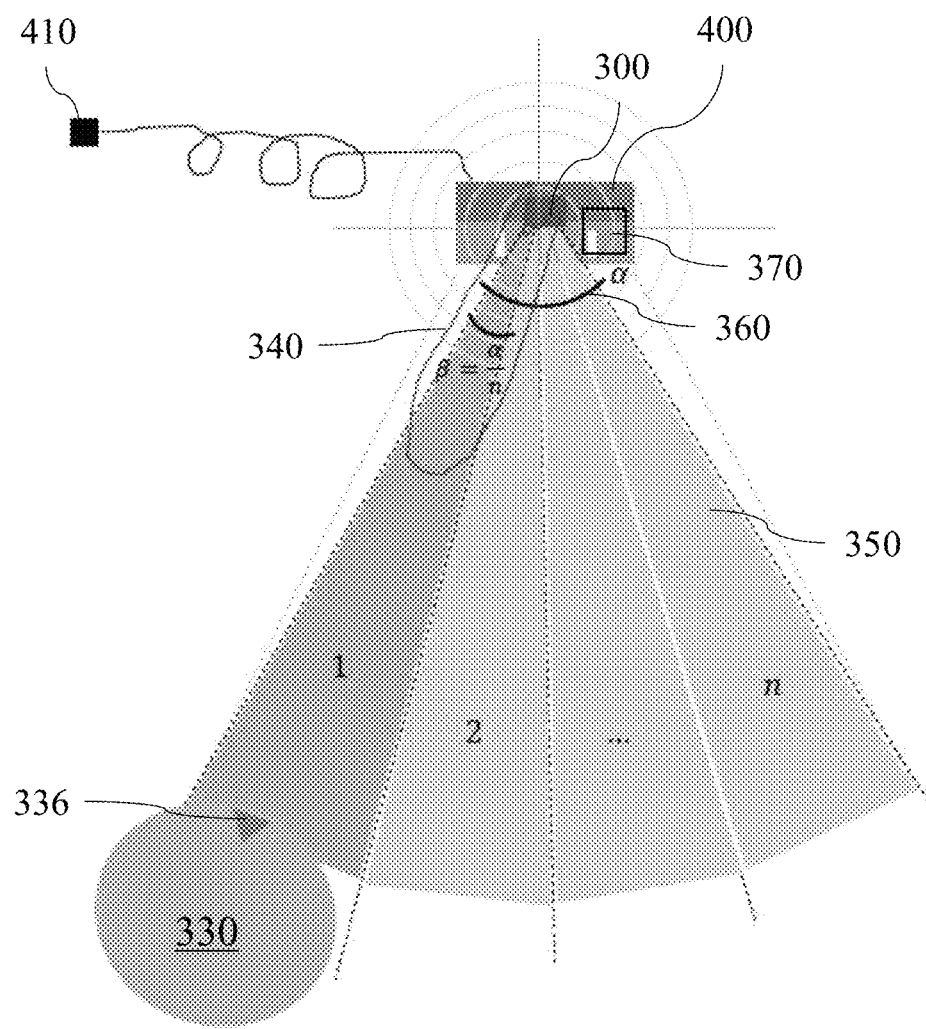
FIG. 6 illustrates another exemplary application of the guiding system comprising a radio-based communication system.

FIG. 6 illustrates another exemplary application of the guiding system 300 comprising a radio-based communication system. The radio-based communication system comprises an interface 370 for wireless communication, e.g., via a wireless local area network (WLAN), WiGig (e.g. WiGig at 60 GHz), Bluetooth (BT), long range (LoRa) technology, mobile radio, or the like. The interface, e.g., comprises a WLAN interface, a BT interface, and/or a RadCom system (e.g. including an orthogonal frequency division multiplexing (OFDM) radar for detection and communication). In some applications, the robot 330 is equipped with a WLAN, BT, WiGig, and/or a mobile radio communication module 336 to communicate with the radio-based communication system via WLAN, BT, WiGig, and/or mobile radio, respectively. In some applications, the robot 330 is (already) equipped with such a communication module 336, e.g. for communication with a user.

In this way, the base station 400 and the robot 330 can communicate the robot's position, battery level, navigation messages, and or other information. This can further reduce the probability of the robot 330 to get lost or discharged before reaching the base station 400.

The examples as described herein may be summarized as follows:

Examples relate to a guiding system for a robot. The guiding system comprises a millimeter-wave positioning system configured to determine a position of the robot relative to a base station for charging the robot. The guiding system further comprises a transmitter configured to emit a radar guiding signal for guiding the robot to the base station and to steer the radar guiding signal towards the position of the robot.

In some examples, the millimeter-wave positioning system is configured to emit a radar positioning signal, receive a reflection of the radar positioning signal from the robot, and determine the position of the robot using the reflection.

In some examples, the millimeter-wave positioning system exhibits a first field of view and the transmitter is configured to emit the radar guiding signal within a second field of view enclosed by the first field of view.

In some examples, the transmitter exhibits a plurality of transmit elements each having a respective field of view and the transmitter is configured to steer the radar guiding signal towards the position of the robot by emitting, using one of the transmit elements, the radar guiding signal selectively in a single field of view upon determination of the robot being located therein.

In some examples, the millimeter-wave positioning system is configured to emit the radar positioning signal using the transmitter.

In some examples, the guiding system comprises a communication system configured to communicate with the robot.

In some examples, the communication system is configured to use the transmitter to communicate with the robot using a phase-modulated signal.

In some examples, the radar guiding signal includes the phase-modulated signal.

In some examples, the communication system comprises at least one of a wireless local area network, WLAN, interface, a Blue-tooth, BT, interface, and a mobile radio interface to communicate with the robot.

In some examples, the communication system is configured to communicate the position to the robot.

In some examples, the communication system is configured to transmit navigation messages to the robot, the navigation messages comprising instructions for movement of the robot.

Further examples relate to a base station for a robot, the base station comprising a guiding system of any one of the preceding claims.

Further examples relate to a method for guiding a robot. The method comprises determining a position of the robot relative to a base station for charging the robot and emitting a radar guiding signal for guiding the robot to the base station and steering the radar guiding signal towards the position of the robot.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It is to be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A guiding system for a robot, the guiding system comprising:
    a millimeter-wave radar positioning system configured to determine a position of the robot relative to a base station for charging the robot by:
        emitting a radar positioning signal,
        receiving a reflection of the radar positioning signal from the robot, and
        determining the position of the robot using the reflection; and
    a transmitter configured to emit a radar guiding signal for guiding the robot to the base station and to steer the radar guiding signal towards the determined position of the robot, wherein the millimeter-wave radar positioning system is configured to emit the radar positioning signal using the transmitter, and the positioning system is separate from the robot.

2. The guiding system of claim 1,
    wherein the millimeter-wave radar positioning system exhibits a first field of view; and
    wherein the transmitter is configured to emit the radar guiding signal within a second field of view enclosed by the first field of view.

3. The guiding system of claim 1,
    wherein the transmitter comprises a plurality of transmit elements each having a respective field of view, and
    wherein the transmitter is configured to steer the radar guiding signal towards the position of the robot by emitting, using one of the transmit elements, the radar guiding signal selectively in a single field of view upon determination of the robot being located therein.

4. The guiding system of claim 1, further comprising a communication system configured to communicate with the robot.

5. The guiding system of claim 4, wherein the communication system is configured to use the transmitter to communicate with the robot using a phase-modulated signal.

6. The guiding system of claim 5, wherein the radar guiding signal includes the phase-modulated signal.

7. The guiding system of claim 4, wherein the communication system comprises at least one of a wireless local area network, WLAN, interface, a Bluetooth, BT, interface, and a mobile radio interface to communicate with the robot.

8. The guiding system of claim 4, wherein the communication system is configured to communicate the position to the robot.

9. The guiding system of claim 4, wherein the communication system is configured to transmit navigation messages to the robot, the navigation messages comprising instructions for movement of the robot.

10. A base station comprising the guiding system of claim 1.

11. A method for guiding a robot, the method comprising:
    determining, by a positioning system separate from the robot, a position of the robot relative to a base station for charging the robot, determining comprising:
        emitting a radar positioning signal,
        receiving a reflection of the radar positioning signal from the robot, and
        determining the position of the robot using the reflection; and
    emitting, by the positioning system, a radar guiding signal for guiding the robot to the base station and steering the radar guiding signal towards the position of the robot.

12. The method of claim 11, wherein emitting the radar guiding signal comprises emitting the radar guiding signal within a second field of view enclosed by a first field of view.

13. The method of claim 11, further comprising communicating the determined position to the robot.

14. The method of claim 11, further comprising communicating navigation messages to the robot, the navigation messages comprising instructions for movement of the robot.

15. A method of guiding a robot, the method comprising:
    emitting, by a positioning system separate from the robot, a radar signal over a first field of view comprising a plurality of sub-fields of views;
    receiving, by the positioning system, a reflection from the robot;
    determining, by the positioning system, a position of the robot within an occupied sub-field of view of the plurality of sub-fields of views using the received reflection; and
    after determining the position of the robot, transmitting, by the positioning system, a guiding signal to the robot within the occupied sub-field of view, wherein the guiding signal comprises a beamwidth that is narrower than the first field of view.

16. The method of claim 15, wherein the guiding signal comprises a modulated radar signal.

17. The method of claim 15, wherein the radar signal comprises a millimeter-wave radar signal.

18. The method of claim 15, further comprising communicating with the robot via a communication system.

19. The method of claim 18, wherein communicating with the robot comprises using a phase modulated signal.

20. The method of claim 18, wherein communicating with the robot comprises communicating the determined position to the robot.

* * * * *